United States Patent Office 2,800,693
Patented July 30, 1957

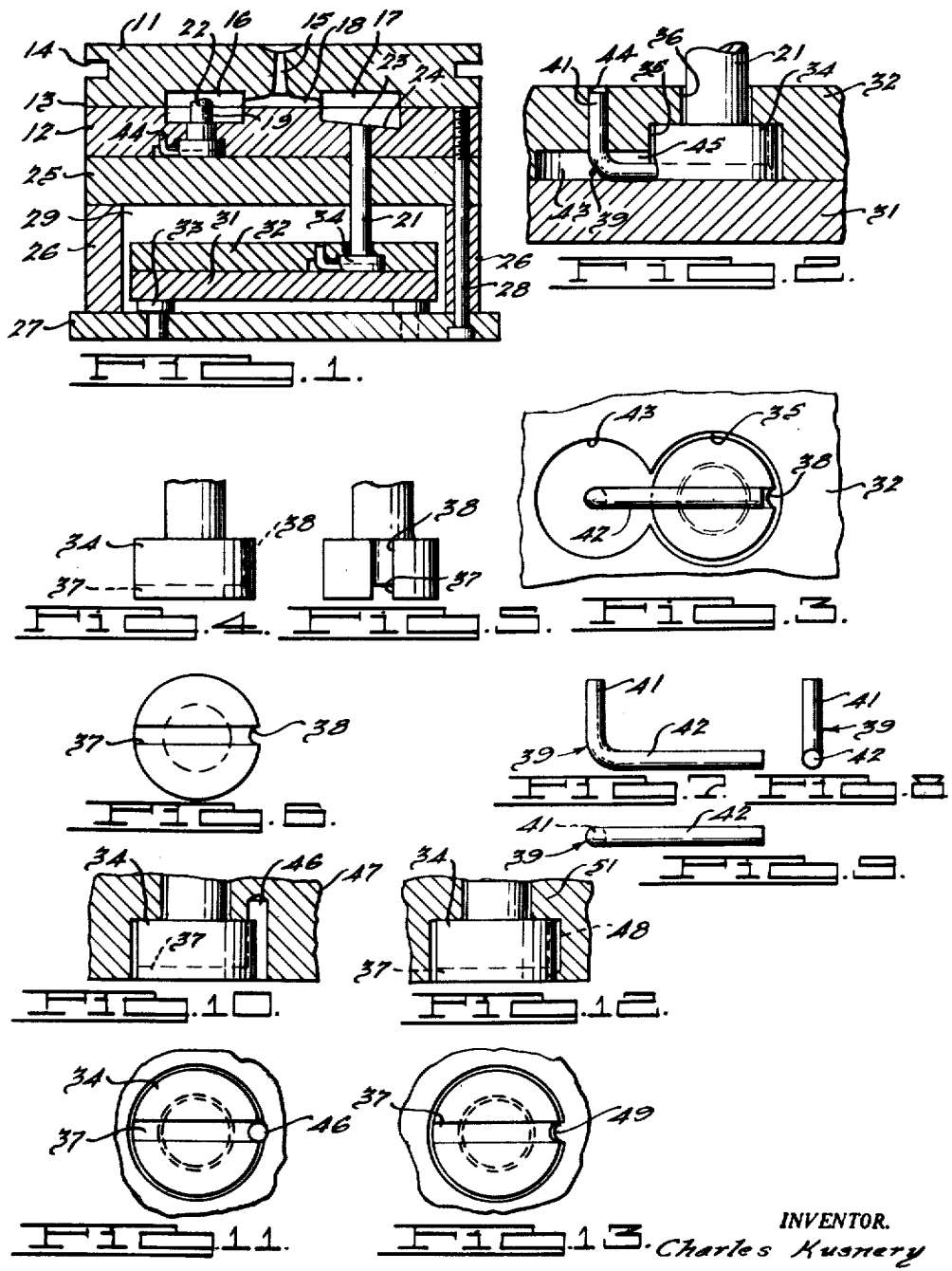

2,800,693

CONSTRUCTION FOR LOCKING EJECTOR PINS

Charles Kusnery, Hazel Park, Mich.

Application February 18, 1954, Serial No. 411,064

8 Claims. (Cl. 22—94)

This invention relates to the molding of plastic and die cast parts, and more particularly to a construction for locking core and ejector pins used in injection and die cast molding operations.

The processes of die casting and of injection molding of plastic parts involve the use of pins which are used both for coring and for ejection of the molded article. As to coring, it is a general practice to provide metal cores fixed to one or both of the cavity plates and which project into the cavity, these core pins often having irregular shapes within the cavity for the production of a particular part. Likewise, it is generally known to use ejector pins carried by ejector plates, that is, pins extending through one of the cavity plates and being movable with respect thereto to knock out the part after molding. The end surface of such ejector pins adjacent the cavity is often of an irregular shape to conform to the particular cavity surface.

Generally, both core pins and ejector pins are machined from round stock in standard sizes, are provided with heads at one end and extend through circular holes in the cavity plates. The use of these core and ejector pins, especially in high production molding operations, gives rise to various problems of economy and manufacturing accuracy which it is a general object of the present invention to overcome. Some of the major problems may be enumerated as follows:

1. It is desirable to have the ejector pins and cores made up in large lots ahead of time and kept in the stock room for ready use.

2. The machining of individual ejector pin or core surfaces to suit particular molds should be an economical operation, and the construction of the ejector pin or core pin should provide the machinist with means for accurately aligning the pin for the machine setup.

3. When aligning the pin in the molding machine, means should be provided for permitting fast and accurate alignment, and this means should preferably be the same as the means for aligning the pin in the machine setup. In this connection, it is desirable for the setup man to have at his disposal alternative methods of alignment so that setups can be made economically in situations where less accuracy is required.

4. Means must be provided for locking the ejector pin or core pin against rotation during the molding operation. This rotation could result from the force of material entering the cavity and impinging on the exposed portion of the pin, and would of course result in a defective part.

5. It is highly desirable to provide means for permitting lateral displacement of the ejector pin during the molding operation. This is due to the fact that during the molding operation the cavity plate through which the ejector pin extends is subjected to considerable heat and will expand laterally, while the ejector pin plate remains comparatively cool. If the locking connection between the ejector pin and the ejector pin plate does not permit lateral displacement of the ejector pin head, distortion and subsequent misalignment of the ejector pin could readily take place.

Various locking constructions for core and ejector pins have been used in the past. Among such known constructions is the pinning method in which a locking pin extends in the direction of the core or ejector pin within matching semicircular recesses formed in the pin head and the retainer plate. A variation of this method is to peen a portion of the retainer plate into the semicircular recess of the ejector or core pin head. Another known method has been the formation of a flat on one side of the pin head, a flat piece of steel being placed in a milled pocket of the retainer plate and clamped against the pin head flat. None of these methods has satisfactorily met the major problems outlined above.

It is an object of the present invention to provide a construction for ejector pin and core pin locking devices which overcomes these problems in a greatly improved manner, and permits the use of such pins with high economy and greatly increased accuracy.

It is another object to provide an improved construction of the above nature which permits large lots of ejector pins and cores to be stocked, minimizes the number of parts required and eliminates the need for machining individual pins to provide a locking recess.

It is a further object to provide a pin locking construction having the above characteristics which permits quick and accurate setups when machining the pin surfaces to fit individual molds, and reduces the necessary number of machining operations in installing the pin in the mold.

It is another object to provide an improved pin locking construction as above described, which permits easy and accurate alignment of the pin in the mold setup. In this connection, it is an object to provide a method and construction which permits the alternative use of other and conventional locking methods where less setup accuracy is required.

It is a further object to provide an improved pin locking construction having the above characteristics, which locks the pin against rotation but permits limited lateral displacement of the pin during the molding operation, thus allowing for expansion of the cavity plates and preventing misalignment of the pins.

It is another object to provide a construction as above described which permits ready removal of the core or ejector pin with the locking means remaining in place and ready for assembly with another core or ejector pin.

Other objects, features, and advantages of the present invention will become apparent from the subsequent description, taken in conjunction with the accompanying drawings.

In the drawings:

Figure 1 is an elevational view in cross section of the cavity plates and adjacent parts of a mold setup, showing a core pin and an ejector pin utilizing the novel locking method and construction of this invention;

Figure 2 is a fragmentary cross-sectional view showing the disposition of the locking pin with respect to the ejector pin and the ejector plates;

Figure 3 is a bottom plan view taken along the line 3—3 of Figure 2 and showing the slot in the ejector pin head and the clearance between the head and the ejector pin retainer plate;

Figure 4 is a fragmentary elevational view showing the slotted ejector or core pin head;

Figure 5 is a side view of the member shown in Figure 4, disclosing a suitable square cross-sectional shape for the pin slot;

Figure 6 is a bottom plan view of the head showing a conventional semicircular slot in the side of the head;

Figures 7, 8 and 9 are front, side and bottom views respectively of the locking pin;

Figure 10 is a fragmentary cross-sectional view of a pin head and its adjacent support, illustrating the manner in which the locking slot of this invention permits alternative use of the conventional pinning method of locking;

Figure 11 is a bottom plan view of the elements shown in Figure 10;

Figure 12 is a view similar to Figure 10 and illustrating how the slot of the novel locking means permits use of the conventional peening method of locking; and Figure 13 is a bottom plan view of the elements shown in Figure 12.

Referring more particularly to the drawings, Figure 1 illustrates a typical molding installation in which the novel pin locking method and construction of this invention is utilized. As shown, a pair of cavity plates 11 and 12 are provided, these plates being united along a parting line 13 when in their closed position. Plates 11 and 12 are adapted to be fastened respectively to the fixed and movable platens (not shown) of a conventional injection or similar molding machine. Plate 11 is provided with a recess 14 for this purpose and is also provided with a sprue 15 for connection to the nozzle (not shown) of the machine. Cavities 16 and 17 are shown as being formed between the cavity plates. These cavities may be connected with each other or may be separate cavities, and gates 18 are provided for feeding the material from the sprue to the cavities.

Means are provided for supporting a core pin 19 and an ejector pin 21 which extend through cavity plate 12 attached to the movable mold platen. In the illustrated embodiment, a single core pin 19 and a single ejector pin 21 are shown. It should be understood however that a different number of core pins or of ejector pins could be present depending on the particular installation. As shown, the end surface 22 of core pin 19 which extends into cavity 16 is of irregular shape. Furthermore, end surface 23 of ejector pin 21 is of inclined shape to conform to surface 24 of cavity 17. A backup plate 25 is secured to the back of cavity plate 12 and serves to hold core pin 19 in place. A pair of support parallels 26 are disposed in back of backup plate 25 and a clamping plate 27 is secured to the outer ends of these support parallels by bolts 28 which extend through the backup plate into cavity plate 12. The ejector pin assembly is disposed within the space or chamber 29 formed by support parallels 26. In particular, an ejector plate 31 and an ejector pin retainer plate 32 are disposed within space 29, and the head of ejector pin 21 is secured between these plates. Plates 31 and 32 are movable in the conventional manner by ejector rods (not shown) when the mold is opened to force ejector pin 21 into cavity 23. Support buttons 33 are provided for limiting the retracting movement of the ejector assembly when the mold is closed.

The novel and improved pin locking means and method of this invention is perhaps best described with respect to Figures 2-9 of the drawings. It should be kept in mind that although Figures 2 and 3 illustrate the cooperation of the locking means with the ejector pin, the principles of the method and construction apply equally to lacking the core pin. As shown, the head 34 of ejector pin 21 is disposed within a counterbored recess 35 in retainer plate 32 and the shank of the pin extends through an aperture 36. The diameters of recess 35 and aperture 36 are preferably made slightly larger than the adjacent surfaces of the ejector pin so that while axial movement is prevented by plates 31 and 32, limited lateral movement of the ejector pin in the ejector assembly is permitted.

Head 34 of the pin is provided with a diametric passageway or slot 37, best seen in Figures 4, 5 and 6. This slot extends entirely across the pin head. Preferably, the slot is of a square or rectangular cross section as seen in Figure 5, although other cross-sectional shapes are contemplated within the scope of the invention. It should be noted that Figures 4, 5 and 6 also show a slot 38 of semicircular cross section extending along the side of the head in an axial direction and in the same plane as slot 37. Slot 38 is a conventional slot used in the pinning method of locking the core or ejector pin and its cooperation with the present invention is described further below. Although the size of slot 37 with respect to the pin head is not critical, it is preferred to have a single standard size of slot for all sizes of ejector or core pins, since this facilitates stocking of the parts as will become apparent.

A novel and improved locking pin generally indicated at 39 is provided in accordance with the present invention. As seen best in Figures 7, 8 and 9, locking pin 39 is of L-shape and may be constructed of standard rod stock. The pin is provided with a mounting leg 41 and a locking leg 42 at substantially right angles. In the present embodiment, the locking leg is shown as somewhat longer than the mounting leg although the relative sizes of these legs is not critical. Locking leg 42 is of such size as to fit snugly within slot 37 of head 34. The inner end of locking leg 42 extends from slot 37 and into a recess 43 provided in plate 32. As shown in Figures 2 and 3, recess 43 may be formed by a simple counterboring operation so that the recess is contiguous with recess 35 which receives head 34. An aperture 44 is provided in plate 32 extending in the direction of the ejector pin axis, and mounting leg 41 of locking pin 39 is received snugly within this aperture. Aperture 44 is spaced inwardly from ejector pin 21, that is toward the central axis of the mold assembly. In this manner locking leg 42 of the locking pin extends outwardly from the mold assembly central axis which is normally the direction of heat expansion of the cavity plates during the molding operation. In the case of core pin 19 the aperture 44 is formed in cavity plate 12 as is evident in Figure 1 and the direction in which this aperture is spaced from the core pin axis is not critical.

The manner in which these parts cooperate to lock the core or ejector pin is apparent from the foregoing description. Since the axis of mounting leg 41 of the locking pin is spaced laterally a substantial distance from the axis of the pin being locked, and since locking leg 42 of the locking pin extends through slot 37, rotation of the pin on its axis will be prevented. In the case of ejector pin 21, lateral displacement of the ejector pin with respect to plates 31 and 32 will be permitted by reason of the direction of extent of locking leg 42. In assembling the locking means it is simply necessary to place locking leg 42 of the locking pin in slot 37 and place mounting leg 41 in aperture 44. To remove the ejector or core pin a screw driver or other tool may be inserted in space 43 under locking leg 42, this location being indicated at 45 in Figure 2. Space 45 is provided by the relative depths of slot 37 and head 34 in recess 35. The locking leg may then be lifted from slot 37, mounting leg 41 being retained in aperture 44. The locking leg may then be swung clear of the pin head and the pin removed without removing locking pin 39. The locking pin may then be used to lock another pin in place, since the slots 37 of all pins are preferably of a standard size.

It should be noted that the inherent nature of the novel locking means and method insures the greatest accuracy in machining and installing a core or ejector pin. The relatively great length of slot 37 in the pin head serves as an accurate guide for the mold maker when setting up the pin for machining its surfaces. The accuracy of such alignment is brought out clearly when it is contrasted with the use of an axial slot such as slot 38, which provides only one point of alignment with respect to axial rotation of the pin. With the present locking method, the opposite ends of slot 37 are far enough apart to give an accurate two-point alignment, and an ordinary piece of key stock can be used for lining up the pin in a milling machine. Moreover, since the same slot 37 is later used for aligning the pin in the mold, any possibility of error between the machining operation and the installing operation is eliminated.

It should also be observed that the novel method of this invention reduces to a minimum the number of machining operations necessary to install the locking means in a molding machine. The whole operation could for example be performed in a drill press by drilling aperture 44 for mounting leg 41 of the locking pin and counterboring recess 43 through which the locking pin extends.

As stated previously, the invention contemplates the alternative use of the conventional pinning or peening methods of locking in cases where less setup accuracy is required. As seen in Figures 10-13, the presence of slot 37 in no way interferes with the drilling of a hole 46 into head 34 and a supporting member 47 such as is used in the conventional pinning method described above. A pin placed in hole 46 will serve a locking function. At the same time, slot 37 can be used in the machining operation preparatory to installation of the pin in the mold, and the machining accuracy afforded by slot 37 will thus be gained. Since hole 46 is contiguous with slot 37 the index used in the machining operation will also be used in the installing operation. Similarly, in Figures 12 and 13 an axial slot 48 may be provided in the side of head 34 for receiving a peened portion 49 of a supporting member 51. Portion 49 will serve a locking function in the conventional manner. Here again, slot 48 will be contiguous with slot 37 so that the latter may be used in machining the pin.

While it will be apparent that the preferred embodiments of the invention herein disclosed are well calculated to fulfill the objects above stated, it will be appreciated that the invention is susceptible to modification, variation and change without departing from the proper scope of fair meaning of the subjoined claims.

What is claimed is:

1. In a locking construction for casting machine ejector pins, a pin permitting lateral float having a head, supporting means for said pin, a passageway in said head transverse to the pin axis, an aperture in said supporting means parallel to the pin axis, and an L-shaped locking member disposed within said passageway and said aperture.

2. The combination according to claim 1, said passageway comprising a diametric slot.

3. The combination according to claim 1, said passageway being diametric, and an axially extending recess on the side of said pin head and contiguous with said passageway.

4. In a locking construction for a casting machine ejector pin of the type having a head and a support for said head permitting lateral float, a diametric slot in said head, an aperture in said support and in spaced parallel relation to the pin axis, and an L-shaped locking member having a locking leg disposed within said slot and a mounting leg disposed within said aperture.

5. In a locking construction for a casting machine ejector pin of the type having a head and a supporting plate therefor, a counterbore in said plate for said head permitting lateral float, a recess formed in said plate and contiguous with said counterbore, a passageway formed in said head transverse to the pin axis, an aperture in said supporting plate contiguous with said recess and in spaced parallel relation with said pin, and an L-shaped locking member extending through said recess, said locking member having a locking leg disposed within said pin head passageway and a mounting leg disposed within said aperture.

6. The combination according to claim 5, the depth of said recess being such that a space is provided between said locking leg and said support plate for the insertion of a removing tool.

7. In a locking construction for a casting machine ejector pin of the type having a head and a support plate, a pin head counterbore in said plate of a diameter slightly larger than the pin head, a diametric passageway in said pin head, an aperture in said support parallel to the pin axis, said aperture being spaced from said pin toward the central casting machine axis, and an L-shaped locking member having a locking leg disposed within said passageway and a mounting leg disposed within said aperture.

8. In combination with a casting machine ejector pin and support therefor permitting lateral float, a locking construction comprising a slot in the head of said pin transverse to the pin axis, an aperture in said support parallel to the pin axis, and an L-shaped locking member disposed within said slot and said aperture.

References Cited in the file of this patent

UNITED STATES PATENTS

| | | |
|---|---|---|
| 1,476,503 | Gammeter | Dec. 4, 1923 |
| 1,533,734 | Gotze | Apr. 14, 1925 |
| 1,611,869 | Anderson | Dec. 28, 1926 |
| 2,118,764 | McWane | May 24, 1938 |
| 2,467,246 | Winkel | Apr. 12, 1949 |
| 2,645,815 | Quarnstrom | July 21, 1953 |

UNITED STATES PATENT OFFICE

CERTIFICATE OF CORRECTION

Patent No. 2,800,693                                                     July 30, 1957

Charles Kusnery

It is hereby certified that error appears in the printed specification of the above numbered patent requiring correction and that the said Letters Patent should read as corrected below.

Column 3, line 58, for "lacking" read --locking--; column 5, line 34, for "of fair" read --or fair--; column 5, line 37, strike out "permitting lateral float" and insert the same after "said pin" and before the comma in line 38, same column; column 6, list of references cited, after line 48, add following:

FOREIGN PATENTS 834,050     Germany------Mar. 17, 1952

Signed and sealed this 22nd day of October 1957.

(SEAL)
Attest:
KARL H. AXLINE

Attesting Officer

ROBERT C. WATSON
Commissioner of Patents